United States Patent [19]
Dove

[11] 3,833,257
[45] Sept. 3, 1974

[54] VEHICLE SEATS, ESPECIALLY FOR AIRCRAFT SEATS

[75] Inventor: Ernest Baker Dove, Auckland, New Zealand

[73] Assignee: Teleflex Limited, Essex, England

[22] Filed: July 26, 1973

[21] Appl. No.: 382,995

Related U.S. Application Data

[63] Continuation of Ser. No. 200,326, Nov. 19, 1971, abandoned.

[52] U.S. Cl. .............................................. 297/284
[51] Int. Cl. ......................... A47c 1/02, A47c 15/00
[58] Field of Search ........... 297/284, 416, 417, 433, 297/216, 345, 346

[56] References Cited
UNITED STATES PATENTS

| | | | |
|---|---|---|---|
| 371,402 | 10/1887 | Wellicomson | 297/460 |
| 567,096 | 9/1896 | Harvey et al. | 297/284 X |
| 3,121,592 | 2/1964 | Anderson | 297/284 |
| 3,137,524 | 6/1964 | Chancellor | 297/284 |
| 3,316,018 | 4/1967 | Stith | 297/416 X |
| 3,357,240 | 12/1967 | Vaughan et al. | 297/417 X |
| 3,561,817 | 2/1971 | Needham | 297/216 |
| 3,632,166 | 1/1972 | Lohr | 297/284 |
| 3,661,421 | 5/1972 | Johnson | 297/417 |

FOREIGN PATENTS OR APPLICATIONS

| | | | |
|---|---|---|---|
| 200,412 | 1/1970 | Germany | 297/284 |

*Primary Examiner*—Paul R. Gilliam

[57] ABSTRACT

A vehicle seat comprising a central spine having a head rest and kidney pads attached thereto, projects upwardly from a pelvic support frame. A seat squab support tray is attached to said pelvic support frame and power means to adjust said central spine is provided.

2 Claims, 2 Drawing Figures

VEHICLE SEATS, ESPECIALLY FOR AIRCRAFT SEATS

This is a continuation of application Ser. No. 200,326, filed Nov. 19, 1971, now abandoned.

This invention relates to vehicle seats, and especially seats intended for aircraft pilots.

In large modern aircraft it is desirable that pilots' seats should be adjustable in a variety of ways, both from the point of view of accomodating the user comfortably and also to put the pilot in the best positon for controlling the aircraft at particular times, for example during take-off and landing. Thus, a pilot's seat may be elevated to different heights during different periods of a flight, in order to give the pilot the best view ahead.

According to the present invention, such a seat is fitted with an articulated forward section of the seat squab, constituting a thigh support that can be adjusted up or down about the point of articulation. Not only does this give adjustment for comfort to suit different users but also it deals with the problem that as the seat is elevated the pilot's feet tend to be moved away from the foot-operated controls of the aircraft. That is to say, the pilot can maintain substantially the same leg reach if the thigh support portion of the seat squab is depressed as the seat elevation is increased.

Preferably, for the comfort of different users, the seat has separate upper and lower back cushions, at least one of which is adjustable up and down the seat back. An adjustable head rest may be provided, together with adjustable arms that can be stowed in positions generally within the seat outline when not in use.

In the preferred arrangement also, the seat back is in articulated connection with the forward-extending seat squab tray so as to be adjustable in regard to recline.

An aircrew seat in accordance with the invention will now be described by way of example and with reference to the accompanying drawings, in which.

Figure 1:
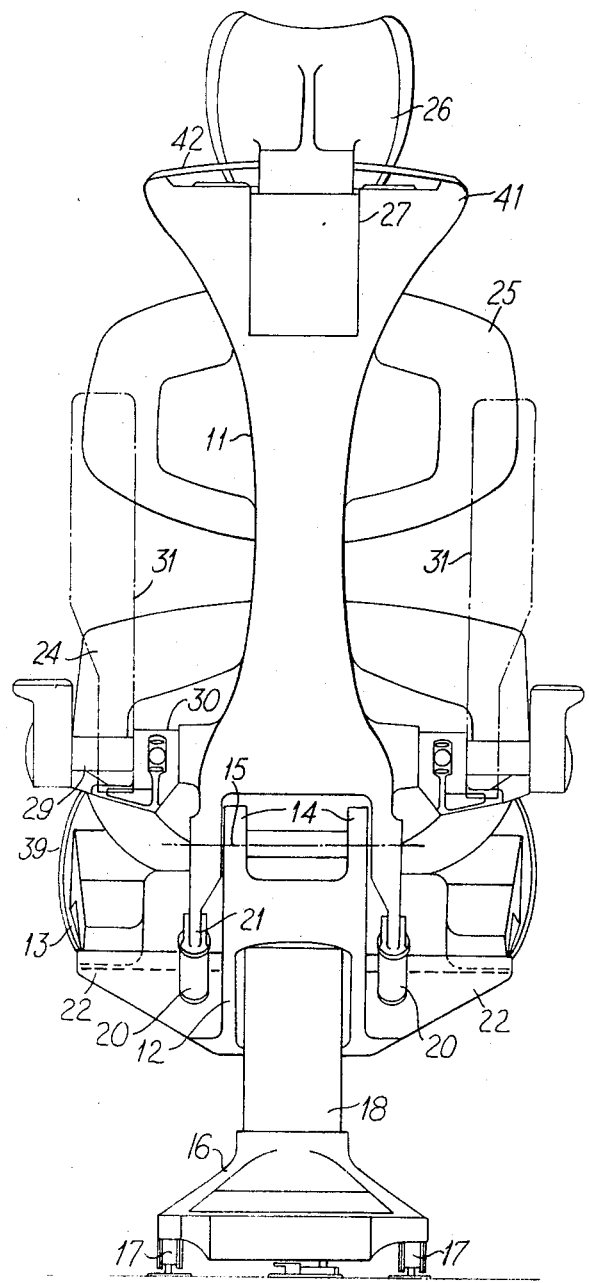
FIG. 1 shows the seat in rear elevation.
Figure 2:
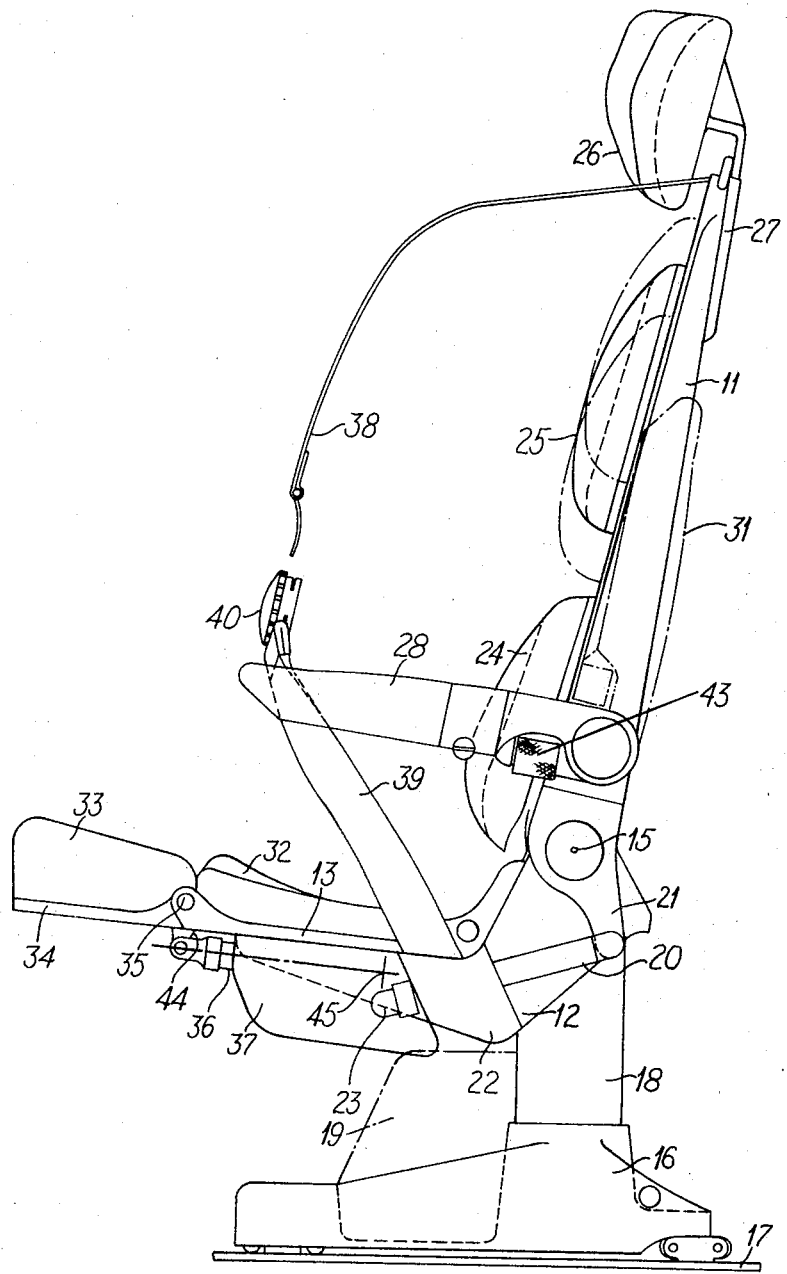
FIG. 2 is a side elevation of the seat.

The frame configuration of the seat is, in general, like that described in U.S. Pat. No. 3,741,513. That is to say, the back of the frame comprises a central spine 11 upstanding from a "pelvic" frame unit 12, and a seat squab support tray 13 extends forward in cantilever fashion from the frame unit 12. However, in the present construction the lower end of the back spine 11 is hinged upon lugs 14 of the "pelvic" frame unit 12 so that the seat back has recline adjustment about an axis 15. The underframe of the seat comprises a seat base 16 adjustable in position along floor track rails 17, and a pedestal 18 upon which the "pelvic" frame unit 12 is supported upon the base 16. By making the pedestal 18 telescopic both seat height adjustment and, if desired, seat rotational adjustment can be provided. One or more of the seat adjustment facilities can be powered by the provision of an optional power pack 19 on the seat base in front of the pedestal 18. Further details of the power drive and the unique three-rail floor track arrangements are given in U.S. Pat. No. 3,741,513.

The recline adjustment of the seat frame back spine 11 is performed by means of duplicate spinning disc type cylinder devices 20 which are pivotally connected to short lever arms 21 on the back spine depending below the hinge axis 15. From there the cylinders 20 pass forward, through holes in wing portions 22 of the "pelvic" frame unit, to further pivotal connections at 23 on the cantilever portion 13 of the seat frame. The back spine 11 carries a lumbar cushion 24, with kidney pads the configuration of which can be selected to suit individual aircrew members. Above this is a shoulder cushion 25 which has rack adjustment up and down the spine 11; and at the top of the spine is a head rest 26 also with height adjustment in a slide 27 at the back of the spine.

Also mounted on the back spine 11 are a pair of arm rests 28. Transverse shafts 29 are carried in and project laterally from bearings 30 on the back spine and the two arm rests are mounted on the outer ends of these shafts so that they can be turned upward into a raised stowed position indicated at 31. The shafts 29 slide inward so as to bring the arm rests 28 inside the seat width in the stowed position until they lie with their extremities behind the shoulder cushion 25; and when thus stowed the arms are substantially within the envelope formed by lateral projection of the outline in side elevation of the back spine. In the position of use, the arm rests 28 are infinitely adjustable in height, by means of knurled adjustors 43, and, after having been stowed, they return to the height that was pre-set.

The seat squab 32 on the cantilevered support tray 13 is extended forward by a separate thigh support squab 33 which is carried by an articulated forward extension 34 of the tray 13. The thigh squab 33 can be dropped and raised by adjustment of the tray extension 34 about the hinge axis 35, this adjustment being effected by a spinning disc type device 36 like those employed for the recline adjustment of the seat back. The adjuster device 36 is pivotally connected at one end to a depending arm 44 on the squab tray extension 34 and at the other end on the main part of the cantilevered tray at 45. As the seat is elevated the thigh squab 33 can be dropped to give the aircrew member using the seat substantially the same reach with his legs.

At one side of the cantilevered tray 13 of the seat frame there is provided a seat control console 37. On this can be grouped controls for power selection, seat height adjustment, recline adjustment, positional adjustment fore-and-aft along the floor track, locking on the floor track, and emergency declutching to allow manual operation of the seat if the power should fail.

The seat harness comprises shoulder straps 38 and two lap belts 39; four straps in all meeting at a quick release box or buckle 40 at the front of the wearer's body. The shoulder straps 38 run back over the top of the back spine 11 which has a widened region 41 at its upper end; the straps pass underneath a trapping bar 42 on the seat back and then down to an inertia locking reel assembly (not shown) within the back spine. The lap belts 39 are also retractible, being taken at their lower ends to reels within the wing portions 22 of the "pelvic" frame unit 12.

What we claim is:

1. A vehicle seat comprising a central spine upstanding from a pelvic support frame, a seat squab support tray attached to said pelvic support frame and extends forward, therefore, said central spine hingedly attached to said pelvic support frame by lug means, said pelvic support frame being supported by telescoping means which is, in turn, supported by a base which is provided with base means adapted to ride on at least three rails, power means pivotally attached to said central spine and said pelvic support frame to effect power recline adjustment of said central spine, said central spine is provided with a lumbar cushion having kidney support pads, a shoulder cushion is also adjustably attached to said central spine and said shoulder cushion is adapted to move up or down said spine, said central spine also being provided with a head rest means at its end opposite to the pelvic support frame.

2. A vehicle seat in accordance with claim 1 wherein arm rests are pivotally attached to said central spine by shaft means, said arm rests adapted to slide axially on their respective shafts such that they may be stowed in a position substantially behind said shoulder cushions, a first seat squab is attached to said pelvic support tray, a second seat squab is pivotally attached to the forward facing part of said pelvic support tray by hinge means.

* * * * *